US010334695B2

(12) United States Patent
Page

(10) Patent No.: US 10,334,695 B2
(45) Date of Patent: Jun. 25, 2019

(54) MULTIVARIATE DAYLIGHT HARVESTING

(71) Applicant: Erik Russell Page, Fairfax, CA (US)

(72) Inventor: Erik Russell Page, Fairfax, CA (US)

(73) Assignee: ERIK PAGE & ASSOCIATES, INC., Fairfax, CA (US)

( * ) Notice: Subject to any disclaimer, the term of this patent is extended or adjusted under 35 U.S.C. 154(b) by 118 days.

(21) Appl. No.: 15/469,554

(22) Filed: Mar. 26, 2017

(65) Prior Publication Data
US 2018/0279448 A1 Sep. 27, 2018

(51) Int. Cl.
H05B 37/00 (2006.01)
G05B 19/048 (2006.01)
H05B 37/02 (2006.01)
F21V 23/04 (2006.01)
H05B 33/08 (2006.01)
F21S 6/00 (2006.01)
F21S 8/04 (2006.01)
G05B 19/042 (2006.01)

(52) U.S. Cl.
CPC ..... *H05B 37/0218* (2013.01); *F21V 23/0442* (2013.01); *H05B 33/0857* (2013.01); *F21S 6/003* (2013.01); *F21S 8/04* (2013.01); *G05B 19/042* (2013.01); *H05B 37/0281* (2013.01)

(58) Field of Classification Search
CPC ........ H05B 37/0227; F21S 8/04; F21S 6/003; G05B 19/048; G05B 2219/31472; G05B 2219/2642
See application file for complete search history.

(56) References Cited

U.S. PATENT DOCUMENTS

| 5,701,058 | A | 12/1997 | Roth |
| 7,592,583 | B2 | 9/2009 | Page et al. |
| 7,683,301 | B2 * | 3/2010 | Papamichael ........ H05B 39/042 250/205 |
| 8,100,552 | B2 | 1/2012 | Spero |
| 8,536,505 | B2 | 9/2013 | Page |
| 2007/0185675 | A1 * | 8/2007 | Papamichael ........... F21S 13/14 702/85 |

(Continued)

OTHER PUBLICATIONS

Craig DiLouie; Designing a Daylight Harvesting System: Part One; AutmoatedBulidings.com; http://www.automatedbuildings.com/news/aug07/articles/zing/070723051101dilouie.htm; accessed on Mar. 14, 2019; published Aug. 2007. (Year: 2007).*

(Continued)

*Primary Examiner* — Daniel J Colilla
(74) *Attorney, Agent, or Firm* — Clifton Leon Anderson

(57) ABSTRACT

A daylight harvesting system includes a daylight harvester device that distinguishes the natural and artificial contributions to the light in a workspace. Distinguishing the contributions allows the values of the contributions to be combined in ways other than linearly summing them to obtain the total light. For example, when the natural light increases, the artificial light may be reduced by less than the natural-light increase to mitigate glare and/or shadows and other artifacts that might otherwise be present and objectionable. The daylight harvesting system can include a human-based sensor located in a workspace, e.g., on or close to a user, so the measurements it takes are not adversely affected by spatial variations across a room in the natural and artificial lighting.

8 Claims, 5 Drawing Sheets

(56) References Cited

U.S. PATENT DOCUMENTS

| | | | | |
|---|---|---|---|---|
| 2008/0281472 | A1* | 11/2008 | Podgorny | G05B 15/02 |
| | | | | 700/276 |
| 2009/0128044 | A1 | 5/2009 | Nevins | |
| 2012/0101556 | A1* | 4/2012 | Baaijens | A61M 21/00 |
| | | | | 607/90 |
| 2013/0009552 | A1* | 1/2013 | Page | H05B 37/0218 |
| | | | | 315/152 |
| 2016/0205744 | A1* | 7/2016 | Patel | H05B 37/0218 |
| | | | | 315/155 |
| 2016/0273726 | A1* | 9/2016 | Adler | F21S 19/005 |
| 2017/0257925 | A1* | 9/2017 | Forbis | H05B 33/0872 |
| 2017/0345208 | A1* | 11/2017 | Ashdown | G06F 17/5004 |

OTHER PUBLICATIONS

Sajol Ghoshal; Intelligent sensors enable environmentally aware and responsive lighting; LEDs Magazine; accessed Mar. 15, 2019; published Apr. 2013. (Year: 2013).*

Provolt Line Voltage Photocell; product data sheet; Leviton Manufacturing Co., Inc.; https://www.leviton.com/fr/docs/Data_Sheet-Provolt_Line_Voltage_Photocell.pdf; accessed on Mar. 14, 2019; published 2015. (Year: 2015).*

* cited by examiner

MULTIVARIATE DAYLIGHT HARVESTING

BACKGROUND

The costs and energy consumed to provide light for building occupants can be reduced by "harvesting daylight", e.g., sunlight admitted through windows. Of course, the amount of daylight available within a building can vary, e.g., as the sun rises and sets, and according to weather conditions. The total (artificial plus natural) light can be monitored and the amount of artificial light can be varied to compensate for changes in available daylight.

DETAILED DESCRIPTION

Figure 1:
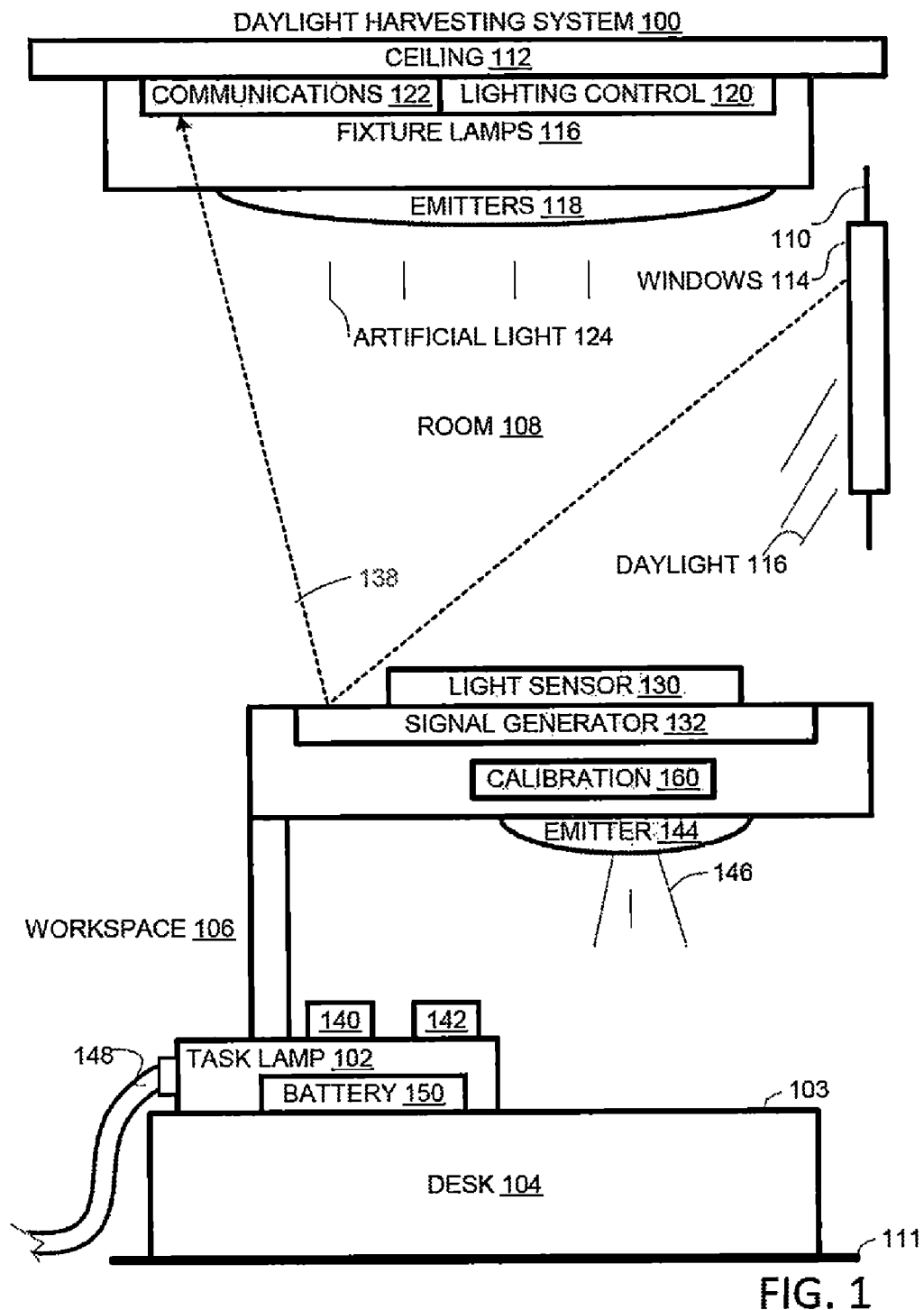
FIG. 1 is a schematic diagram of a daylight harvesting system.

In accordance with the present invention, multi-variate daylight harvesting involves acquiring respective values for attributes of plural light sources are determined and used to regulate a combination of the plural light sources. For example, the light sources can include daylight, e.g., sunlight, or other light admitted through windows and e.g., electrically generated or other "artificial" light, emitted by fixture lamps within a room or building.

The attributes can include illuminance (e.g., horizontal and/or vertical), color (hue, color temperature, spectral distribution), and spatial distributions thereof. Artificial light can be regulated by controlling emitters and/or filters, while daylight can be controlled by blocking, redirecting, and/or filtering. The regulation can involve controlling light to achieve a desired total or other combination of light, e.g., at a workspace. Since lighting may not be uniform throughout a room, and/or since users may desire non-uniform distributions of light throughout a room, an aspect of the invention provides that light can be controlled based on attribute-value determinations made by one or more sensors in a user workspace.

For example, a first light value can be a component of illuminance at a first location due to daylight and a second light value can be a component of illuminance at the first location due to artificial light. The combined value can be the total illuminance from the artificial and daylight light sources at the first location. Herein, "illuminance" is the (total or component) luminous flux incident on a surface, per unit area. It is a measure of how much the incident light illuminates the surface, wavelength-weighted by the luminosity function to correlate with human brightness perception. The artificial light can be controlled to maintain a constant total light at the first location. In some embodiments, light color can be regulated In addition to or instead of illuminance.

As one skilled in the art can recognize, the total light can be controlled without making separate determinations for the daylight and the artificial light. The total light can be measured and then the artificial light can be adjusted to maintain the desired total. In the multivariate approach, the attributes are evaluated independently to allow flexibility in selecting non-linear combinations that might be more desirable than a simple total amount. For example, a high percentage of daylight coming through a side window might result in undesirably contrasty (e.g., characterized by shadows and/or glare) illumination. Decreasing the artificial light less than an amount needed to fully offset an increase in daylight may be desirable to avoid excessive contrast.

The plural respective values can be obtained concurrently using respective sensors. Alternatively, a sensor can be time-multiplexed to provide values for different light sources. For example, a nighttime calibration run can determine artificial illuminance values for a range of settings for the artificial lighting. The total illuminance can be measured. The contribution of the artificial lighting can be determined from its setting. The remainder of the total illuminance can be attributed to daylight.

As shown in FIG. 1, a daylight harvesting system 100 includes a task lamp 102, which stands on a top surface 103 of a desk 104. Desk 104 is situated in a workspace 106 of a room 108. Room 108 includes walls 110, a floor 111, and a ceiling 112. Windows 114 in walls 110 can admit daylight 116 into building 108. Fixture lamps 116 are mounted to ceiling 112; the mounting can be, for example, flush, inset, or standoff. Lamps 116 include respective emitters 118, which may be incandescent, fluorescent or solid state (e.g., organic or inorganic light-emitting diode) emitters. Lamps 116 can include lighting controllers 120 for controlling the ON/OFF state of the lamp and its brightness. Lamps 116 include communication devices 122 for receiving dimming and other commands to be implemented by controllers 120.

Windows 114 admit daylight into room 108; some of this daylight reaches workspace 106. In addition to providing local illumination of its own, task lamp 102 is designed to help harvest this daylight, e.g., by controlling fixture lamps 116 to offset changes in daylight. Thus, artificial light of fixture lamps 116 can be decreased when daylight increases to reduce the energy consumption and cost and to increase comfort and visibility. To this end, in addition to a first control 140 for adjusting the light that it emits, task lamp 102 includes a second control 142 for adjusting the light emitted by fixture lamps 116.

A "task lamp" is a portable (non-fixture) light source designed to provide light to a desk or other work surface. The task lamp can be placed on the desk surface or be clamped or otherwise attached to the desk surface or other nearby surface. Since it is typically located within a workspace within which lighting levels can make a difference, a task lamp can be a useful location for a sensor used to control ambient (including daylight and artificial light from sources located outside the workspace) lighting for the workspace. The task lamp can include separate controls for adjusting the level of the local light on the one hand and for commanding adjustments of overhead fixture lamps (and/or other sources of ambient light) on the other.

In other embodiments, the sensors used to control ambient lighting are integrated into other objects commonly found in a workspace; for example, sensors can be built into computer monitors, bookshelves, desks, chairs, printers, etc. In still other embodiments, the sensors can be separate devices that can be worn by a user, or mounted on or attached to other objects (e.g., a computer monitor) within a workspace. Such sensors may be referred to as "human-based sensors". Herein, "human-based sensors" refers to sensors that record values that closely approximate the environmental conditions experienced by humans. This includes sensors that are physically placed on humans (e.g. "wearables") as well as sensors that are in close proximity to humans (e.g. workspace located sensor).

Task lamp 102 cooperates with fixture lamps 116 to maintain a desired level of lighting at workspace 106 in part by controlling fixture lamps 116 and, thus, the artificial light 124 emitted therefrom. To this end, task lamp 102 includes a light sensor 130 for evaluating the illuminance at workspace 106. Depending on the embodiment, sensor 130 can be designed to measure a single illuminance parameter at a time or plural illuminance parameters at a time (e.g., at different incidence angles). In other embodiments, light sensors are used that measure plural attributes (e.g., color and illuminance) of light.

In one scenario, sensor 130 measures total horizontal illuminance, i.e., the amount of light falling on a horizontal surface. A signal generator 132 of task lamp 102 monitors the sensor output and uses it to determine any adjustment of artificial light required to maintain constant total horizontal illuminance at task lamp 102. Based on this determination, signal generator 132 sends commands to controller 120 of fixture lamps 116; the commands cause fixture lamps 116 to adjust the amount of artificial light they emit to compensate for changes in daylight.

The illustrated embodiment uses the open communication ZigBee protocol to control ZigBee-compatible luminaires/lamps 116. Task lamp 102 sends a ZigBee command to linked luminaires/lamps 116 that simply says, for example, "turn up to 74% of maximum output." Communication devices 122 of lamp/luminaires 116 forward this command to lighting control 120. In response to the command, lighting control 120 changes electrical power inputs to the light emitters 118 such that the light output is adjusted accordingly.

A user can adjust the overall illuminance level targeted by controller 132 by turning knob 140. A second knob 142 is used to control the ON/OFF state and dimming level of a task lamp emitter 144, which emits light 146. Task lamp 102 can be powered via cord 148 and/or by a battery 150. Cord 148 may also be used to communicate with fixture lamps over power lines.

In many scenarios, achieving constant illuminance is not the most desirable approach. For example, strong natural light may result in bothersome shadows at a workspace; extra (over the amount needed for constant illuminance) artificial light may be desirable to reduce the shadows. In another scenario, the cost and energy savings achievable from shutting off fixture lamps may justify operating under purely natural light even when that means less than optimal total luminance at a workspace. For example, in "demand response" (DR) applications, utilities, grid operators or other agents are willing to pay customers that are willing to reduce loads when they get a signal to do so. In such cases, the total Illuminance may decrease rather than remain constant when daylight increases.

In other scenarios, glare can result from a high contrast ratio between the brightness of objects within the field of view of the user. For example, high contrast can result when a bright window is located directly above a dark cubical wall (in the users field of view). In this case, it can be desirable to increase illuminance in the cubical (even though there is more than enough illumination already) in order to decrease the contrast ratio. The sensor can measure vertical illuminance due to light coming from the direction of the windows, to assess glare.

Occupants far from the windows (e.g. interior of a building) in daylight spaces might have clear views of a window but not receive significant illumination from the windows themselves. It may be beneficial to adjust the overhead lighting for these spaces in ways that make the user feel like they are getting light that matches that for which they can see at the window. For example, it can be desirable to increase the light levels and shift the color towards more natural light characteristics when abundant daylight is seen in the window. The present invention allows such results to be achieved either manually or automatically (in accordance with programming of signal generator 132).

In multivariate control scenarios, one may want to control illuminance and let color move freely. One may wish to control for color and let illuminance move freely. One may wish to try to control for both color and illuminance (which might require letting one or both shift from optimal in order to get the best overall result based on an optimization algorithm).

To handle these and other alternative scenarios, the present invention provides for determining, explicitly or implicitly, the separate contributions of daylight and artificial light to the total light at a workspace within a room. For example, signal generator 132 can execute a calibration nm, e.g., at nighttime or under other low natural-light conditions. The calibration run can determine the light values resulting from various fixture lamp settings; the settings and the respective light values due to artificial light can be stored as calibration data 160. For example, the calibration data might indicate that when the luminaire is set to 74% of the maximum setting, the electric lighting provides 250 lux.

During normal operation, the setting can be determined either because it is set by signal generator 132 or as a result of an interrogation of fixture lamps by signal generator 132. During normal operation, the contribution of daylight to total light can be determined by subtracting the amount of artificial light associated with the current setting from the sensed total light value. Note that the contribution of daylight need not be calculated explicitly to be used in controlling artificial light.

In another scenario, rather than being limited to nighttime hours, calibration can occur during daytime hours, provided that the values of changes in daylighting are small relative to the values associated with electric lighting. For example, a calibration process could measure the light values when the electric lighting is off, then measure the lighting values as the electric lighting is adjusted in a controlled and monitored manner across the entire operational range. Then the electric lighting can be turned off once more and the lighting values could be measured once more. If changes in the lighting values recorded before and after the calibration are small (e.g. less than 5% of the difference between the change in lighting values when the electric light is at its minimum and maximum settings) then it can be assumed that changes in daylight were minimal during calibration and changes in light values during calibration can be assumed to be due to changes in electric lighting values.

In some embodiments, fixture calibration is performed while daylight is present. For example, a space may have multiple controllable (e.g. dimming and/or color shifting) overhead luminaires. A calibration procedure can he triggered in which each luminaire changes its light output (perhaps in a manner that is not noticeable to the occupants as it is done slowly or as part of an overall "dynamic" lighting system) in a known pattern and the changes are noted at each sensor location. This can be done at different times of day, on different days, etc. to verify/correct for changes that happen in daylight during this process (e.g. a cloud occludes the sun at exact same time as a controllable luminaire is adjusted). This procedure yields a "map" of each sensor and how much each luminaire contributes to it. The procedure also provides a map to the natural lighting.

Light sensor 130 can include multiple elements so that the contributions of daylight and artificial light can be distinguished, e.g., using spectral and directional information. For example, horizontal and vertical illuminance can be monitored. Vertical illuminance is, in most cases in which skylights are not used, more responsive to changes in natural lighting (arriving through windows) than artificial lighting (generated overhead).

In some embodiments, the light sensor can characterize color in addition to light intensity. Natural and artificial light can have different spectral characteristics that can be detected and used to distinguish their respective contributions. For example, daylight is typically significantly "cooler" (aka, "bluer") than electric light. Spectral characteristics can thus be used instead of illuminance level or as a "double check" on the calibration. For example, if daylight increases by X %, an illuminance increase of Y % and an increase in color temperature of Z kelvin may be expected. If that combination of increases is not confirmed, the signal generator can perform a recalibration.

Figure 2:
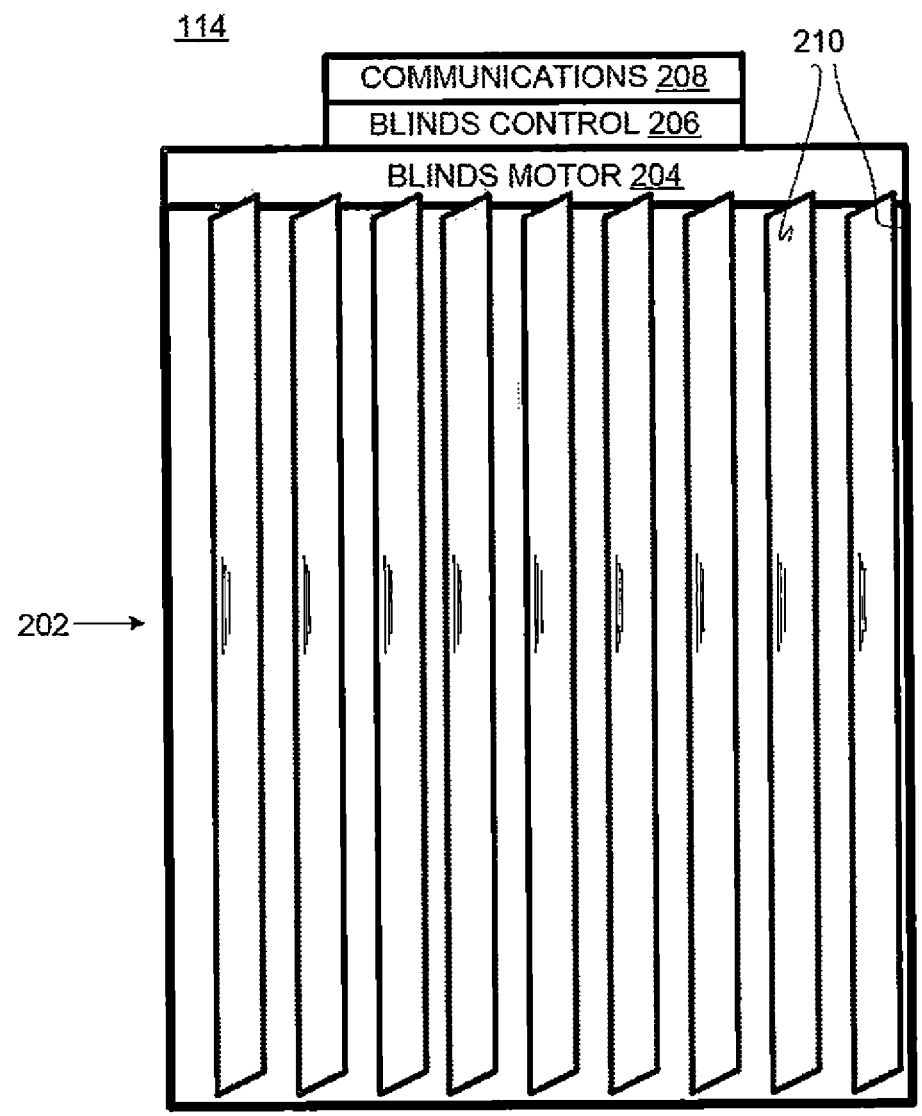
FIG. 2 is a schematic diagram of a blinds system for a window of the daylight harvesting system of FIG. 1.

Task lamp 102 can also adjust the natural light reaching workspace 106 by controlling blinds for windows 114. As shown in FIG. 2, window 114 includes blinds 202, a blinds motor 204, a blinds controller 206, and communications device 208. In response to a command from task lamp 102 (FIG. 1) and received by communications device 208, blinds controller 206 controls blinds motor 204 to rotate slats 210 of blinds 202 so as to admit more or less natural light. In an alternative embodiment, the control of natural light includes modifying the direction/angle/color that natural light is transmitted into the room.

Figure 3:
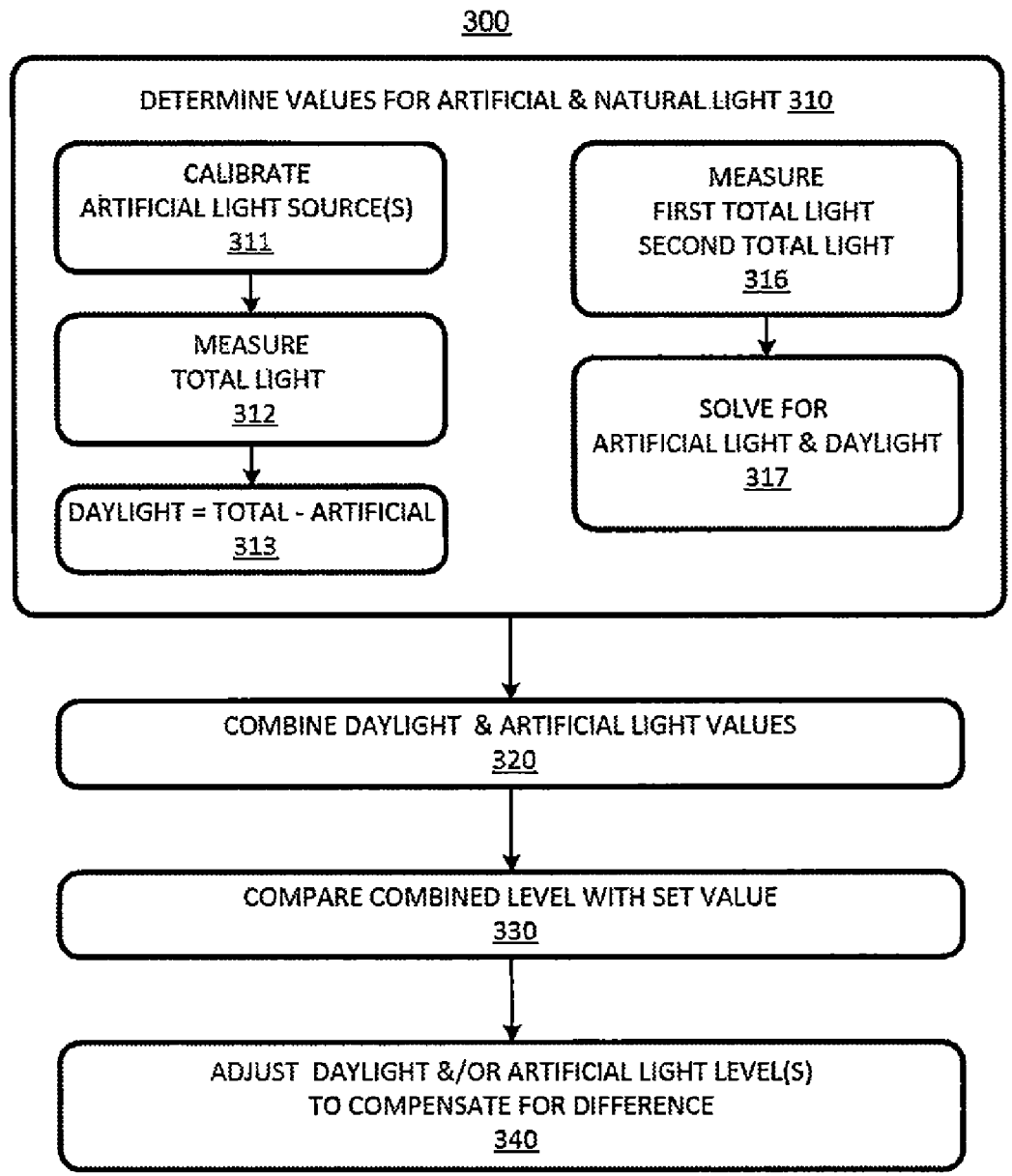
FIG. 3 is a flow chart of a process for controlling a combination of daylight and artificial light in the daylight harvesting system of FIG. 1 and in other systems.

A process 300, flow charted in FIG. 3, for harvesting daylight can be implemented in daylight harvesting system 100 of FIG. 1 and in other systems. At 310, values are determined for respective different light sources, in this case, daylight and artificial light. The determination may be explicit or implicit, e.g., where a daylight value is implicitly determined in a case where the total light is known and the artificial component of the total light is known.

In a "calibrate" variation, at 311, artificial illuminance settings are calibrated. For example, at night when natural lighting is negligible, the artificial lighting can be sequenced through a series of settings, with sensor readings at each setting. The resulting setting-reading pairs can then be stored for reference during daylight operation. During normal operation, the total light can be measured at 312. The natural light contribution to the total light can then be determined at 313, at least implicitly, by subtracting or otherwise removing the artificial light component associated with the current setting of the artificial light source. The current setting can be known either because the daylight harvesting device, e.g., task lamp, sets the artificial light source or, otherwise, the daylight harvesting device can interrogate the artificial light source as to its setting.

In a "multi-measure" variation, at 316, plural light values are captured and used to solve, at 317, for the levels of natural and artificial light. With appropriate spatial filters, it may be possible to measure natural light and artificial light separately. For example, a sensor pointed straight at a fixture lamp may get the artificial illuminance value with negligible contribution from natural light, while a sensor pointed straight at a window may get the natural illuminance value with negligible contribution from artificial light. In other cases, second order contributions of natural light to horizontal illuminance can be accounted for based on the total vertical illuminance; likewise, second order contributions of artificial light to vertical illuminance can be accounted for based on the total horizontal illuminance. In other scenarios, other second-order adjustments can be made for other parameters.

In the calibrate case or the multi-measure case, the values for natural light and artificial light are combined at 320. The combination can be addition, but other (e.g., non-linear) combinations may achieve more pleasing results. For example, artificial light may be decreased less than that needed to maintain a constant light level to reduce glare or shadows caused by increasing natural light. At 330, the current combined value is compared with a user-set combined value. At 340, the artificial light and/or the natural light are adjusted to compensate for any difference between the current combined value and the user-set combined value. In another scenario, the task light might be at a location that is more [or less] impacted by changes in natural light than the location of the user (e.g. the task light may be closer to the window than the user). In this case, the values of the artificial light might be adjusted less [or more] than the change in values measured at the task lamp to maintain a constant light value at the user's workspace.

Figure 4:
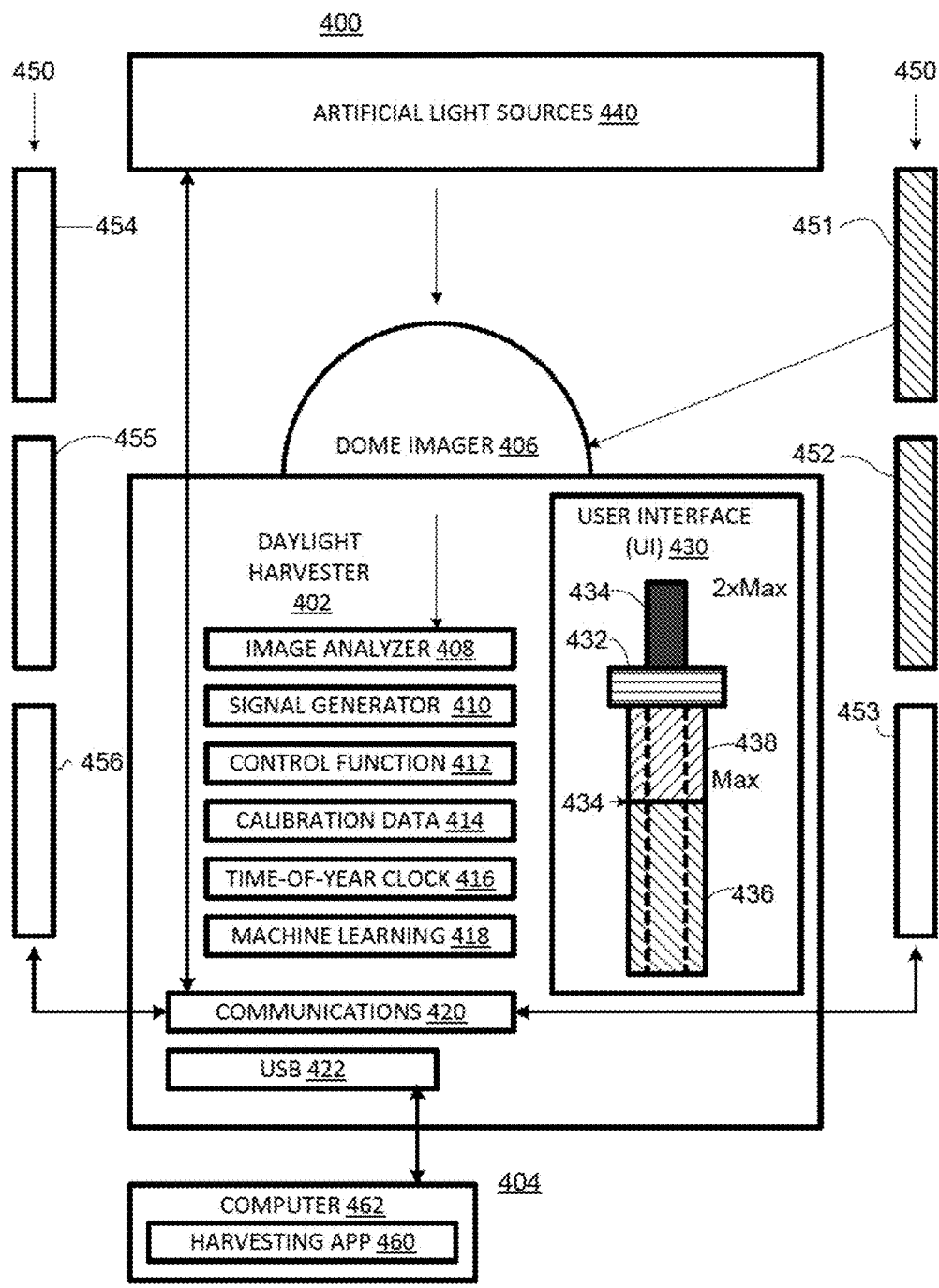
FIG. 4 is another daylight harvesting system.

A daylight-harvesting system 400 includes a daylight harvester 402 in a workspace 404, as shown in FIG. 4. Harvester 402 includes a dome imager 406, an image analyzer 408, a signal generator 410, a control function 412, calibration data 414, a time-of-year device 416, a machine learning engine 418, communications devices 420, and a USB interface (or other data+power) 422.

In addition, light harvester 402 includes a user interface (UI) 430, which includes a virtual or physical slider handle 432 that is movable. relative to a slider track 434. Below slider handle 432 is a representation of the combined light 434 amount that shows the natural light contribution 436 and the artificial light contribution 438. For example, the natural-light contribution 436 can be shown as green, while the artificial light contribution 438 can be shown as another color such as red, blue, or yellow. Of course, other color combinations can be used as well.

Slider track 434 is marked with "Max" and "2xMax" levels. "Max" refers to the maximum amount of light contributable from controlled artificial lighting. "2xMax" is an illuminance or other light value achievable with a sufficient daylight contribution. Allowing a user to select light levels beyond that achievable using artificial lighting alone may be desirable, e.g., to accommodate personnel that require more available light. For example, an average 65-year old may need three times as much light as a 25-year-old. Depending on the embodiment, a user interface might provide for illuminance control up to five times that available using artificial light alone. More generally, the slider range can be selected to ensure energy savings when daylight is abundant and to keep the effective range of the slider from being crammed into a small region at the bottom of the slider track.

In some embodiments, cumulative, e.g., per day, per week, per month, and per year, contributions can be represented textually and graphically. For example, UI 430 may provide indications of how many lumen-hours of electric light versus daylight have been measured.

Dome imager 406, an imager with a dome-shaped field-of-view, provides an image of the field above and around it. A dome imager can include a fish-eye lens or use multiple sensors to capture light incident from multiple directions. Accordingly, dome imager 406 provides a representation of the spatial distribution of the light sources illuminating dome imager 406.

Images provided from the dome imager 406 are transferred to image analyzer 408, which categorizes the light sources as natural or artificial and assigns intensity levels to the categories. Image analyzer 408 analyzes images provided by dome imager 406 to identify the angular locations of natural and artificial light sources and the characteristics of the light they produce.

To this end, the image analyzer 408 may make use of calibration data 414 and time-of-year data from clock 416 to make the categorizations. For example, tune-of-year data can determine an expected position of the sun and, so, help identify its contribution to the natural light at workspace 404. In some embodiments, intensity levels are determined for each of the artificial and natural light sources. The intensity levels represent the intensities of light provided by a source as measured at dome imager 406.

For example, image data can be particularly useful in estimating glare. To characterize glare, it can be useful to know the angle from which light (of intensity above a threshold consistent with direct sunlight) is coming. Knowing this angle can be important in embodiments that provide for blocking or redirecting natural light.

Calibration data 414 can help determine expected amounts and distributions of artificial light. In some embodiments, an imager obtains color images, so the amounts and distributions of component colors in the image can be discerned either to help distinguish artificial and natural light contributions or to help attain a desired combined color.

Signal generator 410 then applies the control function 412 to the parameters being controlled, for example, the natural and artificial illuminance values, to determine a setting or adjustment to be made to the lighting. These adjustments are then communicated via communications devices 420 to appropriate controllers, e.g., of artificial light sources 440 and/or of natural tight shades or filters. For example, the adjustment may be to the intensity of light emitted from fixture lamps. In some embodiments, a lamp fixture can include one or more light emitting arrays, e.g., an red-green-blue (RGB) LED array, so that color may be adjusted as well as overall intensity.

Windows 450, e.g., 451, 452, 453, 454, 455, and 456 can include to blinds (such as those in FIG. 2) or other means for attenuating, filtering, blocking, or redirecting natural light. While, in general, more natural light is preferred to minimize the need for artificial light, windows can be selectively blocked or shaded to minimize the heat and glare associated with direct sunlight. Thus, in the scenario represented in FIG. 4, blinds are set to attenuate light being transmitted through windows 451 and 452.

A user can manipulate slider handle 432 to increase or decrease the overall light level at workspace 404. Machine learning engine 418 can track these adjustments to determine user preferences and, then, update control function 412 based on the user adjustments to minimize their frequency. Light harvester 402 includes a USB port 422 to receive electrical power and, in some scenarios, communicate with a harvesting app 460 on a computer 462. One function of the harvesting app 460 can be to allow updating of the control function. Alternative embodiments can use connections (e.g.,. Thunderbolt or Power-Over-Ethernet) other than USB to provide both power and data connectivity. Other embodiments provide for Zigbee, Bluetooth, WiFi or other wireless data connectivity and a separate power source.

Figure 5:
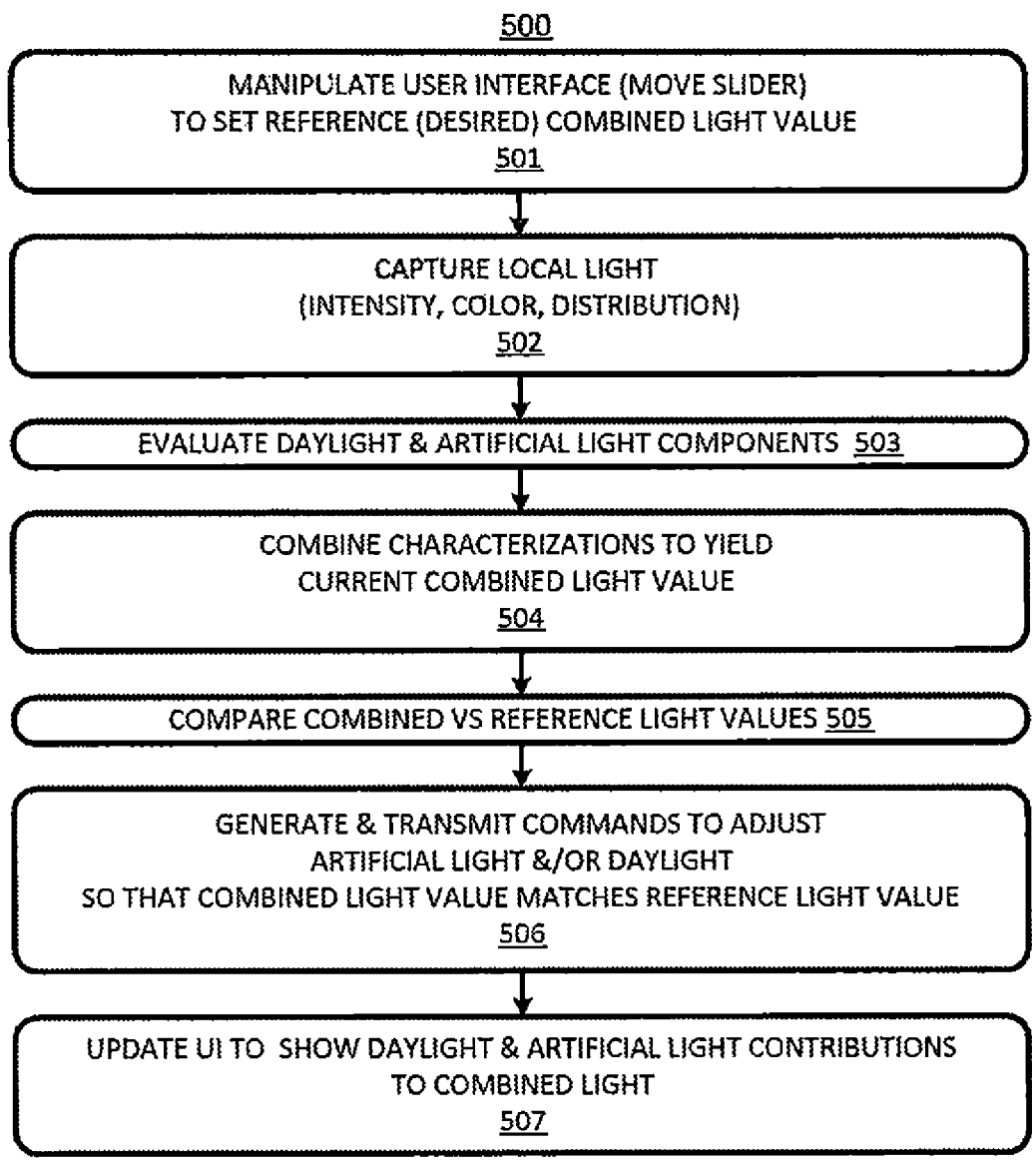
FIG. 5 is a flow chart of a process for controlling a combination of daylight and artificial light in the daylight harvesting system of FIG. 1 and in other systems.

A natural-light harvesting process 500 is flow charted in FIG. 5. At 501, a user interface is manipulated, e.g., a slider is moved, to set a reference light value. The value may be a scalar, i.e., a 1-dimensional vector, or a multi-dimensional vector, e.g., with intensity and color, or a continuum, e.g., a spectral or spatial distribution. At 502 local light is captured, e.g., to acquire an image or other value. At 503, based on the capture, the natural and artificial contributions of the incident light are determined/evaluated. At 504, the natural and artificial contributions are combined to yield a combined light value. At 505, the current combined light value is compared with the reference (desired combined) light value. At 506, commands based on the comparison are generated and transmitted to device controllers so that the current combined value matches the reference light value. At 507, the user interface is updated to show the natural and artificial light contributions to the current combined light.

Herein, "multivariate" refers to attributes that vary as a function of two or more variables. Thus, "multivetriate daylight harvesting" refers to a system for harvesting daylight, aka, natural light, with two or more dimensions of control. In the present context, the dimensions can be dimensions of light. The dimensions can include two or more parameters having the same units, e.g., illuminance associated with natural light and illuminance associated with artificial light. Alternatively or in addition, the dimensions can include two or more parameters having different units, e.g., dimensions of light intensity and of light color.

Herein, "light value" encompasses any value that can be used to characterize light, including, but not limited to illuminance, luminance, other intensity values, color temperature, color space vectors, spectral distributions, and spatial light distributions (e.g., images). As the foregoing examples show, "value" can refer to a vector, a scalar (a one-dimensional vector), and a distribution.

Herein, "determination" encompasses implicit and explicit determination. A value is "explicitly determined" if it is specified. A value is "implicitly determined" if it can be calculated based on other values that have been explicitly determined.

Herein, a "combined value" is a value that is a function of two or more "component values". The combination is said to be "linear" if the combined value is a sum of the component values; otherwise the combination is said to be non-linear. A "reference value" is a value to which a combined or other value is compared, e.g., a combined value may be controlled to match or track a reference value. Typically, a user controls a reference value, which serves as a desired or target value for the combined value.

Herein, a "room" is a structure including a floor, a ceiling, walls, and an interior volume bounded by the floor, ceiling and walls. A "workspace" is a sub-volume of a room interior that extends over no more than half the room floor area and from a half meter to two meters above the floor. Functionally, a workspace is the volume within reach of a person working in the workspace.

Herein, "controller" and "signal generator" refer to programmable hardware processors that can: 1) execute code to implement processes such as those described herein; and 2) generate signals to control or otherwise communicate other objects based on results of the processes.

In the foregoing, admitted prior art, if any, is labeled "prior art"; art not labelled "prior art" is not admitted prior art. The illustrated and other variations upon and modifications to the present invention are provided for by the present invention, the scope of which is defined by the following claims.

What is claimed is:

1. A process comprising:
   determining a first light value and a second light value, the first light value being a value of a first parameter characterizing, at a first location, light from a first source, the second light value being a value of a second parameter characterizing, at the first location, light from a second source different from the first source;
   generating a control signal based in part on the first light value and in part based on the second light value;
   operating a controller, based on the control signal, so as to adjust the first light value;
   determining a combined light value based in part on the first light value and based in part on the second light value; and
   comparing the combined light value with a reference value to yield an error value, the control signal being generated at least in part based on the error value;
   wherein the second parameter uses the same units as the first parameter;
   wherein the combined light value is a non-linear combination of the first light value and the second light value; and
   wherein, in response to a change of a first magnitude and first direction in the second light value, the first light value is changed in an opposite direction by a second magnitude less than the first magnitude.

2. A process comprising:
   determining a first light value and a second light value, the first light value being a value of a first parameter characterizing, at a first location, light from a first source, the second light value being a value of a second parameter characterizing, at the first location, light from a second source different from the first source;
   generating a control signal based in part on the first light value and in part based on the second light value;
   operating a controller, based on the control signal, so as to adjust the first light value;
   determining a combined light value based in part on the first light value and based in part on the second light value; and
   comparing the combined light value with a reference value to yield an error value, the control signal being generated at least in part based on the error value;
   wherein the second parameter uses the same units as the first parameter;
   wherein the combined light value is a non-linear combination of the first light value and the second light value; and
   wherein, in response to a change of a first magnitude and first direction in the second light value, the first light value is changed in an opposite direction by a second magnitude greater than the first magnitude.

3. A process comprising:
   determining a first light value and a second light value, the first light value being a value of a first parameter characterizing, at a first location, light from a first source, the second light value being a value of a second parameter characterizing, at the first location, light from a second source different from the first source;
   generating a control signal based in part on the first light value and in part based on the second light value;
   operating a controller, based on the control signal, so as to adjust the first light value;
   determining a combined light value based in part on the first light value and based in part on the second light value; and
   comparing the combined light value with a reference value to yield an error value, the control signal being generated at least in part based on the error value;
   displaying a graphic element dimensioned to indicate a magnitude of the combined light value, the graphic element having a first segment having a length corresponding to the first light value and a second segment having a length corresponding to the second light value;
   wherein the second parameter uses the same units as the first parameter;
   wherein the combined light value is a non-linear combination of the first light value and the second light value; and
   wherein, in response to a change of a first magnitude and first direction in the second light value, the first light value is changed in an opposite direction by a second magnitude greater than the first magnitude.

4. The process of claim 3 wherein the adjusting the reference value includes moving a handle of a slider relative to a slider track, the graphic element extending along the slider track to the slider handle so that a length of the graphic element changes as the slider handle is moved.

5. A light harvesting system comprising:
   a sensor for characterizing incident light;
   an image analyzer for evaluating first and second components of the light to obtain respective first and second light values, the first light value characterizing light from a first light source and incident the sensor, the second light value characterizing light from a second source and incident the sensor, the second light source being different from and separate from the first light source;
   a signal generator for
      determining a combined light value based in part on the first light value and based in part on the second light value,
      comparing the combined light value with a reference value to yield an error value, and
      in response to a change in the first light value, generating a command to adjust an amount of light from the second light source and incident the sensor so as to offset the change in the first value, the command being generated at least in part based on the error value obtained by determining a combined light value based in part on the first light value and based in part on the second light value, and comparing the combined light value with a reference a value to yield the error value; and
   a user interface representing the combined value partitioned between the first value and the second value.

6. The system of claim 5 wherein the user interface includes a physical or virtual slider that, when manipulated, changes the reference value, the slider including a track and a handle, the handle being movable relative to the track to effect an adjustment of the reference value, the user interface providing a graphic element that extends along the track to the handle so that the graphic element changes a length as the slider handle is moved, the graphic element including a first segment corresponding to the first light value and a second segment corresponding to the second light value.

7. The system of claim 6 wherein the handle is positionable to set the reference value at a level above that corresponding to a maximum that can be provided by the available artificial light sources.

8. The system of claim 5 wherein the user interface provides for setting the reference value at a level above that corresponding to a maximum that can be provided by the available artificial light sources.

* * * * *